United States Patent Office 3,582,987
Patented June 1, 1971

3,582,987
METHOD FOR PRODUCING POLYMERS AND COPOLYMERS OF CERTAIN UNSATURATED HYDROCARBONS
Giulio Natta, Piero Pino, and Giorgio Mazzanti, Milan, Italy, assignors to Montecatini Edison S.p.A., Milan, Italy
Filed June 8, 1955, Ser. No. 514,098
Claims priority, application Italy, July 27, 1954, 25,109/54
Int. Cl. C08f 1/42, 3/10
U.S. Cl. 260—93.5
15 Claims

ABSTRACT OF THE DISCLOSURE

There is disclosed a process for polymerizing unsaturated hydrocarbons of the formula $$CH_2=CHR$$

in which R is a saturated aliphatic, an alicyclic or an aromatic radical, alone, in mixtures with one another, or in mixtures with small amounts of another monomer copolymerizable therewith. In the formula given R may be, in specific modifications, an alkyl, cycloalkyl or aryl radical. The process involves polymerizing the unsaturated hydrocarbons, alone or in the mixtures, in contact with a catalyst prepared from a halide of a transition metal belonging to Groups IV to VI inclusive of the Mendeleeff Periodic Table and an alkyl compound of a metal belonging to Groups II to III of said Table, in the presence of the monomer.

---

The process herein is an improvement over the process of our companion application Ser. No. 710,840 filed Jan. 24, 1958, for polymerizing the higher alpha-olefines with pre-formed catalysts prepared by mixing the transition metal compounds with metal alkyls. Said application Ser. No. 710,840 is, in turn, a division of our application Ser. No. 514,097, now abandoned.

Uniquely, the initial polymerizates obtained by the method described herein are, usually essentially, mixtures of linear, head-to-tail amorphous polymers and crystalline polymers having no branches longer than R. The polymers can be separated from the polymerizate by fractional dissolution. The crystalline polymers may comprise as high as 30% or even up to 55% of the mixture and have high molecular weights and fiber-forming properties. The amorphous polymers may also have relatively high molecular weights and may exhibit rubberlike properties.

One method for polymerizing the unsaturated hydrocarbons to obtain these unusual polymers or polymer mixtures is described in said application Ser. No. 514,097 which was filed concurrently herewith. The method disclosed in said application utilizes, as the polymerization aid, the agent previously described in Belgian Pat. No. 533,362 for the polymerization of ethylene to polymers of high molecular weight, and obtained by reacting a catalytic heavy metal compound and a catalytic metal alkyl compound together in the dissolved state. As noted in our application, supra, these polymerization aids permit the production of high molecular weight polymers of the higher homologues of ethylene, for instance propylene, when the molar ratios of the components thereof are such that the metal alkyl compound is not more than ten times the heavy metal compound and preferably is less than five times the heavy metal compound.

The catalytic metal alkyl compound comprises a substance or a mixture of substances selected from the group consisting of simple and complex compounds the molecules of which contain as a central atom an element from the group forming the second and third columns of the Periodic Table, i.e., beryllium, magnesium, zinc, cadmium, and other elements of the second group as well as boron, aluminum and other elements of the third group.

The valences of the aforesaid central atom are linked to the same or different alkyl radicals such as ethyl, propyl, butyl, etc. One valence of the central atom may be satisfied by halogen or an alkoxy radical.

The catalytic heavy metal compound consists of a compound or a mixture of compounds of a heavy metal selected from a subgroup of Groups IV to VI of the Periodic Table, including thorium and uranium, i.e. compounds of the elements of titanium, zirconium, hafnium, thorium, vanadium, tantalum, niobium, chromium, molybdenum, tungsten and uranium. The metals specified are transition metals of Groups IV, V and VI of the Mendeleeff Periodic Table.

As compounds of these elements there are used as the halides.

In the method of said application Ser. No. 514,097 the unsaturated hydrocarbons are polymerized with the aid of these special polymerization agents by causing the heavy metal compound and the metal alkyl compound to react together in an inert solvent, such as a saturated aliphatic hydrocarbon, and adding the monomer or monomer mixture to be polymerized to the resulting solution of the reaction product.

It has now been found that a remarkable increase in the rate of polymerization of the unsaturated hydrocarbons of the defined type, for example, of propylene, and a higher yield of the polymeric product, can be obtained if the polymerization aid is prepared in the presence of an olefin, and preferably of the alpha-olefin or unsaturated hydrocarbon to be polymerized. This is, for instance, the case when using polymerization agents obtained from a catalytic titanium compound, such as titanium tetrachloride and an alkyl aluminum compound.

The polymerization agent prepared in this way, i.e., in the presence of an unsaturated hydrocarbon, and preferably of the unsaturated hydrocarbon or alpha-olefine to be polymerized contains, bound to polyvalent metals, chlorine or other halogens or other monovalent groups, which were initially bound to metal, as titanium or aluminum, as well as several different alkyl groups which constitute a complex having an asymmetric structure, owing to the fact that it contains substituents of different type bound to the metal.

The polymerization agents prepared in the presence of the free unsaturated hydrocarbon or alpha-olefine is found to be considerably more efficient than the agent prepared from the same reactants but in the absence of free alpha-olefine.

When the agent is prepared under the last-mentioned conditions, for instance by reacting titanium tetrachloride with a trialkyl aluminum, a black precipitate is formed which contains titanium, aluminum, halogens and alkyl groups in proportions depending on the particular conditions employed. The precipitate contains alkyl groups containing a larger number of carbon atoms than are contained in the alkyl groups of the starting alkyl aluminum compound. Thus, when one mol of triethyl aluminum is reacted with 0.75 mol. of titanium tetrachloride dissolved in a non-volatile saturated hydrocarbon, a gas is evolved which consists mostly of ethane and contains a small percentage of ethylene, butylene and hydrogen, and a black product precipitates. This latter is spontaneously inflammable in the air and, when decomposed with either water or alcohols, evolves a gas which consists mostly of saturated unbranched hydrocarbons containing, on the average, three carbon atoms (chiefly ethane and n-butane) and some hydrogen.

In contrast, when the polymerization agent is prepared in the presence of the alpha-olefine, preferably with heating, the black product formed is more dispersed, contains, as soon as it is formed, longer, branched alkyl groups, and a lower percentage by weight of titanium, In practice, it is, as has been noted, a more efficient polymerization agent for the unsaturated hydrocarbons.

These polymerization agents prepared in the presence of free alpha-olefine, more specifically the free alpha-olefine to be polymerized, are different from those prepared from the catalytic heavy metal and the catalytic metal alkyl in the absence of free alpha-olefine, and more particularly efficient for producing high polymers of the alpha-olefines which are liner, of head-to-tail structure, and comprise portions having a marked tendency to crystallize because the catalysts come into contact with the monomers as soon as the catalysts are prepared. The mechanism may be explained by the fact that these polymerization agents prepared in accordance with the present method cause the unsaturated hydrocarbon or alpha-olefine (which latter term includes styrene) to insert itself in the linkage between a polyvalent metal and a carbon atom of the growing polymer chain in a particular orientation, due not only to the polarization of the double bond (as in the general case of ionic type polymerizations) but also to steric reasons connected with the particular structure of the complex formed by the polymerizing agent with the growing polymer chain.

It may be assumed that the vinyl group of the unsaturated hydrocarbon is selectively chemi-absorbed, either on the solid catalyst or on the inorganic portion of the catalyst-polymer complex, which orients the reaction between tthe carbon atoms of the

group of the unsaturated hydrocarbon and the —$CH_2$ end group of a growing alkyl bound to the polyvalent metal of the polymerization agent.

The polymers we obtain, which are mixtures of linear, head-to-tail amorphous and crystalline polymers having no branches longer than R are unique in this art. That both types of polymers are linear is shown by their infrared spectra. For example, in the case of our polypropylenes, both the amorphous and crystalline polymers have similar infra-red spectra which are completely different from the infra-red spectra of the known branched polypropylene in which the branches are longer than R.

According to Flory (Principles of Polymer Chemistry, 1953, pp. 55–56, 237–38) a vinyl polymer containing asymmetric carbon atoms, as for instance

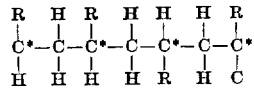

is to be considered as a copolymer of the two different monomer units

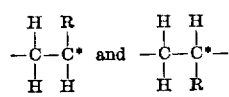

in one of which the asymmetric C atom (C*) has an $l$ configuration, and in the other a $d$ configuration.

When monomer units some of which contain an asymmetric carbon atom having an $l$ configuration and some of which contain an asymmertic carbon atom having a $d$ configuration recur statistically along the polymer chain, as is the general case for all known vinyl polymers, the polymer may be considered as a copolymer of the two types of structural units and if the substituent R is much larger than an H atom, the polymer (or copolymer in the sense just explained) is substantially non-crystalline and does not have any 1st order transition temperature.

Prior to this invention, the only known example of a vinyl polymer existing in both an amorphous and in a crystalline form are the polyvinyl ethers prepared by Schildknecht and co-workers (Ind. Eng. Chem. 40 (1948) 0. 2104; ibid 41, (1949) 00.1998, 2891). Those polyvinyl ethers are, of course, quite different from the polymeric products of this invention.

The difference in the properties of the two types of polymers we obtain must be attributed to a different distribution, along the main chain, of the asymmetric carbon atoms having the same steric configuration. That is to say, we have mixtures of polymers in which, for at least long portions of the chain, the asymmetric carbon atoms have the same steric configuration which may be either $l$ or $d$, and the polymer is highly crystalline, with polymers in which the asymmetric carbon atoms, along the chain, have different steric configuration, some having the $d$ configuration, and others the $l$ configuration, the distribution of those asymmetric carbon atoms of the same steric configuration being statistical and the polymers being amorphous.

The structure of our new crystalline high polymers of the alpha-olefines obtained by the present process was determined from X-ray data on drawn fibers of said polymers. The elementary cell dimensions for the different alpha-olefine polymers were measured by us as reported in the accompanying Table 1.

TABLE 1

| Polymer | Identity period along the chain axis, A. | X-ray Melting point, °C. | X-ray Density, g./cc. | Density by weight |
|---|---|---|---|---|
| Polypropylene | 6.50±0.05 | 160 | 0.94 | 0.92 |
| Poly-alpha-butene | 6.70±0.1 | 125 | 0.96 | 0.91 |
| Poly-alpha-pentene | 6.60±0.1 | 75 | | 0.87 |
| Polystyrene | 6.65±0.05 | 230 | 1.12 | 1.08 |

NOTE.—The X-ray densities were calculated for polystyrene and polybutylene on the basis of an hexagonal cell (space-group R 3c or R 3c) having respectively $a=21.9$ A. for polystyrene and 17.3 A. for polybutene. The cell contains 6 chain portions each containing 3 monomeric units. As no sufficient data is available to establish the correct unit cell of polypropylene, the X-ray density for this polymer was calculated by indexing the equatorial X-ray reflections on the basis of an oblique cell with $a=6.56$ A., $b=5.46$ A., $\gamma=106°.30'$, and considering the identity period along the fiber axis $c=6.5$ A.

From the above it is clearly apparent that the identity period along the fiber axis is, in all cases, of the order of magntiude of 6.5–6.7 A.

By comparing X-ray and density data, it may be seen that each stretch of principal chain included in the elementary cell corresponds to 3 monomeric units

(—$CH_2$—CHR—)

and, that, therefore, a regular succession of monomeric units having alternatively $d$ and $l$ asymmetric carbon atoms can be excluded. Among all possible remaining regular successions of $d$ and $l$ assymmetric carbon atoms which could lead to a crystalline polymer, on the basis of the X-ray data, the most probable is the one in which, at least for long portions of the main chain, all the asymmetric C atoms have the same steric configuration.

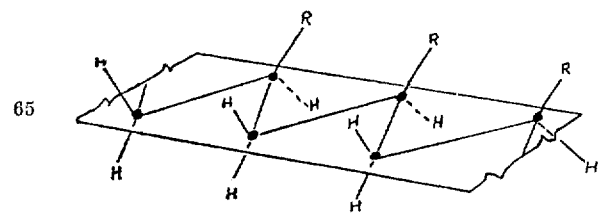

(Model of a portion of the main chain of a crystalline polyalpha-olefine according to the present invention, arbitrarily fully extended in a plane in which model the R substituents on the tertiary C atoms are all above and their H atoms below the plane of the chain.)

In this case the stable existence of a planar fully extended paraffinic chain seems most unlikely owing to the steric hindrance of the substitutent groups R. In the crystalline state, the main chain must therefore assume a non-planar conformation. We have found this conformation to be spiral-like.

The hypothesis of a coiled conformation of the main chain in the crystalline state agrees with the value of the identity period along the same chain (6.5–6.7 A.) which is smaller than the length of the planar, fully extended structure (7.62 A. for 3 monomeric units).

Our linear, regular head-to-tail macromolecules having substantially no branches longer thand R and the main chain of which has substantially a structure of the kind illustrated in the model (isotatic structure) are recognized in the art (following us) as "isotactic" macromocules, whereas our macromolecules having substantially no branches longer than R and in which the asymmetric carbon atoms of the two possible steric configurations have a substantially random distribution along the main chain, are recognized in the art (following us) as "linear, regular head-to-tail atactic" macromolecules.

The term "isotatic" was originated by one of us (G. Natta) for identifying the structure of the kind shown in the model, our macromolecules having substantially that kind of structure, and our polymers consisting of these macromolecules having substantially that kind of structure (see, for example, the Natta et al. communication to the Editor of the Journal American Chemical Society published in said Journal on Mar. 20, 1955, reveived for publication Dec. 10, 1954, and the Nataa article published in the Journal of Polymer Science April 1955, vol. XIV, issue No. 82, pp. 143–154, received for publication on Feb. 17, 1955), and is used herein for convenience and conciseness.

The isotactic structure imparts to the product properties not previously known for any polymer of an unsaturated hydrocarbon of our type.

In general, in preparing the polymerization agent, the heavy metal compound and the metal alkyl compound are used in a molar ratio of 1:3 to 1:10.

Solvents suitable for use in preparing the solution of the heavy metal compound and of the metal alkyl include paraffinic hydrocarbons such as, for instance, a light gasoline substantially free of olefinic bonds, n-heptane, iso-octane, and other solvents of the non-aromatic type.

It may be convenient to prepare the polymerization agent in the presence of a high concentration of the unsaturated hydrocarbon in the liquid phase. When the unsaturated hydrocarbon is liquid at the temperature of polymerization, the catalytic alkyl metal, e.g. alkyl aluminum compound may be dissolved directly in a portion of the liquid unsaturated hydrocarbon to be polymerized, after which the catalytic heavy metal, e.g., titanium compound may be added, preferably at a temperature above room temperature. The remainder of the unsaturated hydrocarbon to be polyerized may then be added.

In some instances, the reaction is violent and accompanied by a marked increase in temperature. In such cases, it is advantageous to add a solution of the heavy metal, for instance titanium, compound to the solution of the metal alkyl compound, either discontinuously, in small increments, or continuously at a uniform rate, in order to control the temperature and avoid a sudden sharp temperature rise.

The method of this invention is specific for polymerization of the unsaturated hydrocarbons of the type described. Even if the unsaturated hydrocarbon or alpha-olefine or formula $CH_2$=CHR in which R is alkyl, cycloalkyl or aryl has, mixed therewith, an olefine which does not contain the vinyl group, the macromolecules of the polymerizate contain regularly succeeding head-to-tail groups dreived only from the alpha-olefine. When the asymmetric tertiary carbon atoms have the same steric configuration, at least for long portions of the main chain, our linear, regular polymers are also partially or completely crystalline or crystallizable and have fiber-forming properties. For instance, when a mixture of butene-1 and butene-2 is poymerized according to our present method, the crystalline portion of the polymer obtained does not differ, essentially, from the crystalline polymer obtained by polymerizing pure butene-1 by the same process, while the residual monomer mixture has an increased butene-2 content. This permits of the selective polymerization of the butene-1 contained in crude mixtures without the necessity of separating it from butene-2 also contained in the mixture, prior to the polymerization.

The polymerization product may contain ethylene in the polymer molecule. Thus, when triethyl aluminum is used as the alkyl aluminum compound in preparing the catalyst, a portion of the ethylene which may be formed from it by substitution with another olefine, appears in the molecule of the polymer, and occurs in the less highly crystalline portion thereof. This appears from an evaluation, by means of infra-red spectroscope, of the ratio between the methyl and methylene groups in the different fractions obtained by extracting the polymerizate with different solvents for the amorphous, partially crystalline and highly crystalline polymers, respectively.

We have also ascertained that when, in place of triethyl aluminum, there is used, in preparing the polymerization agent, an alkyl metal, e.g., aluminum compound in which the alkyl groups contain more than two carbon atoms, the polymers obtained comprise a large proportion of fractions having a higher intrinsic viscosity as compared to the remaining fractions. All of the polymers obtained by the present method are characterized by a tendency to a regular structure. The regularity is especially pronounced, however, when there is used, in preparing the polymerization agent, an alkyl metal, e.g., an alkyl aluminum compound the alkyl groups of which have the same number of carbon atoms as the unsaturated hydrocarbon to be polymerized.

Thus, as is shown in the examples below, a propylene polymer obtained by using, as polymerization aid, a reaction product of tripropyl aluminum and titanium tetrachloride prepared in the presence of free alpha-olefine, had an intrinsic viscosity of 2.52 ml./g. This product, in the unfractionated condition, could be spun to fibers of good mechanical properties. The polypropylene produced under the same polymerization conditions but using triethyl aluminum in the preparation of the catalyst, on the other hand, had a lower intrinsic viscosity (1.34 ml./g.) and was more suitable for the production of fibers having good mechanical properties after removal of the amorphous fractions.

The polymerization can be carried out at different temperatures and, as a distinguishing advantage over processes in which free radicals are employed as polymeriztiona initiators, the present method yields polymerizates of high molecular weight, with high polymerization rates, even when the polymerization is conducted at relatively high temperatures. In this respect, the present process is substantially different from prior art processes for the polymerization of alpha olefines. Temperatures between 50° C. and 100° C., and more specifically between 60° C. and 70° C. may be used.

Crystalline polymers may also be obtained by polymerizing, in accordance with the present method, alpha-olefines higher than propylene, including butene-1, butene-1 mixed with butene-2, pentene-1, -pentene-1-mixed with pentene-2, hexene-1, styrene and so on.

The present method of polymerization thus offers the advantage that the alpha-isomers of the higher olefines e.g. a butene, pentene and so on, need not be excessively purified but may contain beta- and other isomers (butene-2, pentene-2), from which mixture of isomers the present method selectively polymerises the alpha-isomer, enriching the other isomer or isomers in the unpolymerized residue.

The temperature of transition from the crystalline to the amorphous state decreases with increasing length of the radical R, in the case of polymers of aliphatic alpha-olefines.

For polybutene-1, e.g. the temperature at which the crystalline structure disappears is lower than for polypropylene.

As compared with linear crystalline polyethylene, both polypropylene and polybutene-1 obtained in accordance with our invention show, in the stretched condition, a remarkably higher reversible elasticity. By increasing the number of carbon atoms in the radical R, the polymer, while having a regular structure resembles more an elastomer. When it is deformed by stretching, it exhibits very high elongation.

When an alpha-olefine or unsaturated hydrocarbon as defined herein is copolymerized with small amounts (1–10%) of another olefine or of a di-olefine containing a vinyl group, the high polymer obtained still has a degree of crystallinity similar to that of a poly-alpha-olefine.

As stated above, R in the formula $CH_2=CHR$ may also be cyclic, as for instance cyclohexyl, cyclohexenyl-phenyl, etc. Particularly interesting, are the polystyrenes produced by the present method, and characterized by macromolecules of regular structure which, at least for long sections of the chain, have the same steric arrangement of the asymmetric carbon atoms. The solid styrene polymers are crystalline and have high density and very high melting points, which are much higher than the melting points of the polymers of pure styrene known heretofore.

Polymers of the unsaturated hydrocarbons obtained by our improved polymerization method have, especially after orientation of the molecules by mechanical treatments such as stretching, a notable tendency to crystallize and are, therefore, particularly adapted to the production of textile fibers. For instance, the polypropylene having a high molecular weight (intrinsic viscosity of the solutions above 2.5 ml./g.) may be readily oriented by drawing, with or without the application of heat. Thus, these polypropylenes, which are obtained comprise mixtures of amorphous and crystalline polymers, can be extruded to form fibers without prior separation of the amorphous polymers, and the fibers, after cold stretching thereof, exhibit good mechanical properties. The amorphous portions can be selectively removed from the fibers, before or after the stretching, by treating the fibers with a solvent for the amorphous portions which does not appreciably swell the crystalline portions.

The polymerizate obtained, for instance, as in Example II below, may be softened, as such, and then extruded through a spinneret at 170–200° C., using nitrogen under a few atmospheres pressure. The continuous filaments so obtained have mechanical characteristics that depend on the extent of stretching and also on the filament diameter. The following values (Table 1) were found for fibers formed by extruding the unfractionated polymer of Example II to filaments under nitrogen at a pressure of 1–2 atms.

TABLE 1

| Diameter | Percent cold stretch | Breaking load referred to the initial section, kg./sq. mm. | Elongation at break, percent |
|---|---|---|---|
| 0.5 mm | 0 | 2.3 | 520 |
| 0.2 mm [1] | 400 | 30 | 50 |

[1] After cold-stretching.

The polymerizate comprising the amorphous and crystalline polymers can be treated with selective solvents to remove the amorphous polymers, and the crystalline polymers can then be extruded to filaments. However, the extrusion of the crystalline polymers is less readily accomplished unless higher temperatures and pressures are used and, therefore, it may be preferred to extrude the polymer mixture in which the amorphous polymers serve as plasticizing agents and then selectively dissolve the amorphous polymers out of the filaments before or after, but preferably after, stretching them. Table 2 gives the results obtained by extruding the product of Example II through a spinneret to form filaments and then passing the filaments (before or after stretching) through ethyl ether to remove the polymers of lower molecular weight without appreciably swelling the higher molecular weight crystalline portions of the filament.

TABLE 2

| Elongation by cold stretching, percent | Filament diameter, mm. | Breaking load referred to initial section, kg./sq. mm. | Elongation at break, percent |
|---|---|---|---|
| 0 | 0.6 | 3.5 | 470 |
| 150 | 0.25 | 20.5 | 130 |
| 0 | 0.1 | 12.7 | 500 |
| 300 | 0.05 | 52.0 | 50 |

Breaking loads higher than 70 kg./sq. mm. referred to the section at break, are thus readily attained.

The strongly stretched filaments have unusually high reversible elasticity values, and are otherwise similar to wool. In comparison with wool, the polypropylene filaments and fibers of the invention have improved mechanical characteristics. The polypropylene of this invention exhibits very interesting behaviour on stretching. Extruded filaments of high crystalline polypropylene may not exhibit by further stretching a yield point corresponding to a maximum in the strain-elongation plot.

Polybutene-1 produced by the instant process is also very readily spinnable into fibers which can be cold-stretched and, after such stretching, have good mechanical properties and high elasticity. In comparison with the polypropylene, however, polybutene-1 tends to lose crystallinity at a lower temperature and is, therefore, somewhat less dimensionally stable at high temperature.

Polymers and copolymers of the aliphatic alpha-olefines higher than butene-1 are, in general, more suitable for the preparation of elastomers.

The molecular weight of the products was estimated from specific viscosity measurements in tetrahydro-naphthalene solutions at a polymer concentration of 0.1 gm. per 100 gms. of solvent, and from intrinsic viscosity measurements. Specific viscosity is the viscosity of the solution less the viscosity of the solvent, divided by the viscosity of the solvent. By "intrinsic viscosity" is means the limit of the ratio between specific viscosity and concentration for concentrations tending to zero $$\lim_{C \to 0} \frac{\eta \text{ spec}}{C}$$

where C is the concentration of the solution in gm./cc.

The polymers with which the invention is particularly concerned have average molecular weights above 20,000 and may have much higher average molecular weights up to 400,000 and higher.

Preparation of the polymerization agent in the presence of an olefine, desirably the alpha-olefine to be polymerized, may be carried out in an oscillatable autoclave in which the polymerization is to be conducteed. The pressure in the autoclave is preferably held between normal atmospheric pressure and 100 atmospheres, most desirably between normal atmospheric pressure and 30 atmospheres, i.e., a relatively low pressure is preferably used as compared with that applied in other polymerization processes.

The polymerization lasts for several hours up to several days, the autoclave content being kept in motion until the reaction ceases. The gaseous phase above the reaction product is then vented, and the reaction product consisting of a solid mass is worked up.

The reaction mass contains as impurities, inorganic compounds originating from the decomposition of the catalyst as well as residual catalyst itself. The product is, therefore, treated with a suitable agent, for instance methanol, decomposition the residual catalyst, and the product which is still soaked with the inert solvent and, say, methanol, then contains, (a) crystalline (isotactic) polymers
(b) partially isotactic polymers
(c) amorphous atactic polymers
(d) inert solvent
(e) methanol or the like, and
(f) inorganic compounds, e.g. of Al and Ti.

This mass may be treated with a solvent for the amorphous polymers and, after removal of the latter, the residue is a dark-colored suspension of the crystalline polymers mixed with the inorganic impurities. By bubbling HCl through the suspension, the inorganic compounds are dissolved and the suspension becomes white. (The crystalline polymer remains undissolved. By adding additional methanol, most of the dissolved amorphous polymer is precipitated. The purified polymer mixture is then separated by filtration.

The following examples are given to illustrate certain specific embodiments of the invention, it being understood that these examples are not intended as restrictive of the scope of the invention.

EXAMPLE I

About 600 ml. of solvent (heptane-isooctane mixture) containing 11.4 g. triethyl aluminum are introduced into a 18/8 stainless steel autoclave of 2150 ml. capacity. 325 g. of propylene are added and the mixture is heated up to 60° C.; then 3.6 g. titanium tetrachloride dissolved in 50 ml. solvent are admitted into the autoclave. The temperature rises spontaneously in a few minutes up to 113° C. and then slowly decreases. When the temperature reaches 80° C., 1.8 g. titanium tetrachloride dissolved in 50 ml. gasoline are added. A further smaller temperature increase is then observed. The autoclave is kept in agitation for about two hours. It is cooled then to 60° C. and the residual gases are released.

The polymerizing agent is decomposed by introducing into the autoclave 150 g. of methanol. After stirring for a few minutes, the reaction product, consisting of a solid mass drenched with methanol and gasoline, is discharged. The product is slurried in ether and treated with hydrochloric acid to remove most of the inorganic substances, and is then coagulated with methanol and filtered. Thus 282 g. of a white solid product are obtained having a softening point of about 130–140° C. The yield of solid polypropylene on the introduced propylene is 87%; the yield on the converted propylene is higher than 95%.

The polymer obtained is fractionated by hot extraction with solvents, using, successively, acetone, diethyl ether and n-heptane.

The acetone extract corresponds to 40.5% of the polymer obtained and consists of a rubbery, amorphous solid. In Tetralin solution at 135° C. it shows an intrinsic viscosity equal to 0.49 (corresponding to a molecular weight of 11,000).

The heptane extract corresponds to 24.4% of the polymer obtained and consists of a partially crystalline solid having an intrinsic viscosity equal to 0.95.

The residue which remains after said extractions amounts to 27.2% of the total polymer and consists of a powdery, highly crystalline solid having a first-order transition point of about 160° C. In Tetralin solutions at 135° C. it shows an intrinsic viscosity equal to 1.77 (corresponding to a molecular weight of about 78,000).

EXAMPLE II 530 ml. of gasoline containing 15.6 g. tripropyl aluminum and 275 g. propylene are introduced into a 2150 ml. autoclave, which is then heated up to 70° C. Thereafter, 3.6 g. titanium tetrachloride dissolved in gasoline are added. The temperature rises spontaneously to 95° C., then drops down again to 80° C. A further addition of 1.8 g. titanium tetrachloride is made. The autoclave is then kept in agitation for four hours while keeping the temperature at 80° C. By operating as in Example I, 209 g. of solid polymer are obtained. The purified, unfractionated polymer begins to soften at 140° C. The yield is 76% on the introduced propylene, and higher than 95% on the converted propylene.

The acetone extract corresponds to 7.1% of the polymer obtained and consists of oily, low molecular weight products.

The ether extract corresponds to 32.4% of the polymer obtained and consists of a rubbery, amorphous solid having an intrinsic viscosity of 0.9.

The heptane extract corresponds to 19.1% of the polymer obtained and consists of a partially crystalline solid having an intrinsic viscosity of 0.95.

The residue which remains after said extractions corresponds to 41.4% of the polymer obtained and consists of a powdery solid product which appears highly crystalline on X-ray examination and has an intrinsic viscosity of 4.6 and becomes soft at about 180° C. The mechanical properties of samples obtained from such products are due to the higher viscosity, better than those of samples obtained by the procedure described in Example I.

EXAMPLE III 500 ml. of gasoline containing 12 g. diethyl aluminum monochloride, and 310 g. of propylene are introduced into a 2150 ml. autoclave, which is heated to 60° C. Two portions of, respectively, 3.6 and 1.8 g. TiCl$_4$, dissolved in gasoline, are then added. The reaction proceeds as described in the foregoing examples.

The reaction product consists of 248 g. of solid, white, polypropylene. The yield is 80% on the introduced propylene and about 95% on the converted propylene.

The acetone extract, consisting of oily products, corresponds to 15% of the polymer obtained.

The ether extract, consisting of a rubbery, amorphous solid, corresponds to 44% of the polymer obtained and has an intrinsic viscosity of 0.4.

The heptane extract corresponds to 16.4% of the polypropylene obtained and consists of a partially crystalline solid with intrinsic viscosity 0.78.

The residue which remains after said extractions corresponds to 14.4% of the product obtained, has an intrinsic viscosity of 1.53 and appears highly crystalline on X-ray examination.

EXAMPLE IV

A solution of 11.4 g. of triethyl aluminum in 500 ml. of gasoline is introduced into a 2150 ccm autoclave, 267 g. of propylene are then added and the autoclave is heated to 68° C.; then a solution of 6.8 g. of isoprene in 100 ml. of gasoline is introduced into the autoclave. Soon afterwards 3.6 g. of titanium tetrachloride in 50 ml. of gasoline are added. A temperature increase of about 10° C. is noticed. Two further additions of titanium tetrachloride are then made. About six hours from the start of the reaction, the catalyst is decomposed with 100 g. of methanol and the residual gases are released. The polymer obtained is purified as in Example I; 225 g. of a white solid product are obtained, with a conversion of 82% on the total olefines and diolefines present. The product absorbs bromine; it has a lower crystallinity than the polymers obtained under the same condition from propylene alone.

EXAMPLE V

A solution of 11.4 g. of triethyl aluminum in 500 ml. of gasoline, and 320 g. of a mixture of propylenepropane (containing 15% propane) are introduced in a 2150 ml. autoclave. The mixture is heated to 71° C., and 3.6 g. of titanium tetrachloride dissolved in 50 ml. of gasoline are then added. The temperature rises spontaneously to 108° C., then goes slowly down again. After about one hour, a further 1.8 g. of titanium tetrachloride dissolved in gasoline are added and a further, smaller temperature increase is noticed. About three hours from the first addition of titanium tetrachloride, methanol is admitted into the autoclave and the unreacted gases are released. The reaction product purified as in Example I, consists of 200 g. of a solid white polymer. The yields are 73% on the introduced propylene and 93% on the converted propylene. The obtained polypropylene shows properties which are practically identical with those of the polymer obtained from pure propylene.

EXAMPLE VI 160 ml. of gasoline containing 5.7 g. of triethyl aluminum, and 85 g. of butene-1 (Philips Petroleum Co. technical grade) are introduced into a 435 ml. autoclave. The autoclave is heated to 81° C., and 1.8 g. of titanium tetrachloride dissolved in 35 ml. of gasoline are then added. A spontaneous temperature increase of some degrees occurs.

After about one hour a further addition of titanium tetrachloride dissolved in gasoline is made; a spontaneous temperature increase of about 10° C. occurs. The autoclave is kept in agitation for some hours at a temperature of 90-98° C.

Operating as in the foregoing examples, 10 g. of a white solid product are obtained, which softens at 110° C. and appears crystalline on X-ray examination. The residue of the extraction with ether corresponds to 46% of the obtained polymer and shows an intrinsic viscosity, calculated from measurements similar to those described in Example I, of 1.44 ml./g.

EXAMPLE VII 400 ml. of gasoline containing 11.4 g. of triethyl aluminum, and 291 g. of a butene-2-/butene-1 mixture (with 70% of butene-1) are introduced into a 2150 ml. autoclave. The autoclave is then heated to 71° C. and 3.6 g. of titanium tetrachloride dissolved in gasoline are added; the temperature rises to 77° C. After two hours, a further addition of 3.6 g. of titanium tetrachloride is made. The autoclave is kept in agitation for some hours at a temperature in the range of 80-85° C. Operating as in the foregoing examples, 86 g. of white solid product are obtained. Said product shows characteristics similar to those described in Example VI. Fibers are readily obtained from this product (the polymer mixture) by extrusion in a spinneret under nitrogen pressure at temperatures close to the softening point. They show a mechanical strength of the same order as the fibers obtained from polypropylene, but a higher elasticity.

The polymer mixture was fractionated, as in preceding examples, using hot solvents.

The acetone extract amounting to 14% of the total polymer, consists of oily, low molecular weight products.

The ether extract, which amounts to 35.5% of the total polymer obtained and consists of a rubbery, amorphous solid having an intrinsic viscosity of 0.35, corresponding to a molecular weight of about 7000.

The residue of the ether extraction is completely extractable with n-heptane, with heating, and consists of a highly crystalline solid having a melting point of 125° C. and an intrinsic viscosity of 1.02, corresponding to a molecular weight of about 33,000.

EXAMPLE VIII 25 gms. of hexene-1, dissolved in 29 g. of hexane, containing 5.7 g. triethyl aluminum, are heated under reflux in a 500 ml. flask fitted with a stirrer, under nitrogen atmosphere. 1.8 g. of titanium tetrachloride dissolved in hexane are then added and the mixture is allowed to boil under reflux for five hours. The obtained solution is treated after cooling with methanol, then with diluted hydrochloric acid, and finally evaporated to dryness. The formed polymer corresponds to a conversion on the employed hexene higher than 50%. This polymer is soluble in gasoline and ether, slightly soluble in methanol. The portion insoluble in methanol shows very marked viscous elastic properties.

EXAMPLE IX

A solution of 11.4 g. of triethyl aluminum in 400 ml. of n-heptane and 250 g. of monomeric styrene are introduced under nitrogen into a 2150 ml. autoclave. The autoclave is heated to 68° C. and at this temperature a solution of titanium tetrachloride in 50 ml. of heptane is injected under nitrogen into the autoclave. After three hours, during which period of time the temperature is kept between 68 and 70° C., a solution of 3.8 g. of titanium tetrachloride in 50 ml. of heptane is injected into the autoclave. Six hours after the first addition of titanium tetrachloride, 100 ml. of methanol are pumped into the autoclave and then the reaction product is discharged. It occurs as a viscous liquid containing in suspension a fine powder.

The reaction mass is then treated with hydrochloric acid in order to bring to solution the inorganic products present. By addition of a large quantity of methanol a polymer coagulates; this polymer is filtered off and treated with acetone which is acid due to the presence of hydrochloric acid. In this way the amorphous polystyrene and the inorganic impurities, which are eventually still present, are brought to solution.

The residue which remains after said treatment with acetone is vacuum dried with heating; 30 g. of polystyrene consisting of a white powder are thus obtained. The polymer appears highly crystalline on X-ray examination. The crystalline polystyrene obtained has a molecular weight of about 2,800,000 (as calculated from viscosimetrical measurements in benzene at 25° C.,), a densityof 1.08 and a first-order transition point higher than 210° C. The solvents employed in the purification and polymerization are then vacuum concentrated with heating to a small volume and finally treated with methanol. The amorphous polymer is thus precipitated. This polymer is isolated by filtration and vacuum dried with heating. 50 g. of a solid, amorphous polymer, having a molecular weight of about 10,000, are thus obtained.

EXAMPLE X

A solution of 8.2 g. of diethyl zinc in 100 ml. of n-heptane is introduced under nitrogen into a 435 ml. autoclave. 115 g. of propylene are then introduced and the whole is heated, while agitating, to 62° C. At this temperature a solution of 3.8 g. of titanium tetrachloride in 20 ml. of n-heptane is injected into the autoclave.

The autoclave is then kept in agitation for about ten hours at a temperature between 60 and 70° C. After said period of time the unreacted gases are vented, methanol is pumped into the autoclave and the reaction product is discharged. The purification is carried out as described, in the previous examples, by treatment with ether and hydrochloric acid in the heat, followed by a complete coagulation of the polymer with methanol.

After filtering and vacuum drying in the heat, the polypropylene amounts to 16 g. which are then submitted to a hot extraction with solvents. The acetone extract, consisting of oily, low molecular weight products, corresponds to 41% of the polymer obtained.

The ether extract, corresponding to 20% of the polymer obtained, consists of an amorphous product, and has an intrinsic viscosity of 0.23.

The heptane extract, corresponding to 20% of the polymer obtained, consists of a partially crystalline solid with intrinsic viscosity 0.41.

The residue which remains after said extractions corresponds to 19.45% of the polymer obtained and consists of a highly crystalline solid product with intrinsic viscosity 1.22.

EXAMPLE XI

A solution of 5.7 g. of triethyl aluminum in 50 ml. of n-heptane is introduced under nitrogen into a 435 ml. autoclave previously emptied of the air. 118 g. of propylene are then introduced into equipment which is heated, while agitating, up to a temperature of 80° C. At this temperature a solution of 4.3 g. of $VCl_4$ in 50 ml. of n-heptane is injected into the autoclave under nitrogen pressure. The autoclave is kept in agitation at temperatures between 80 and 83° C. and after said period of time methanol is pumped into it. The polymer is then purified, proceeding as described in the preceding examples. 77 g. of a solid polypropylene are thus obtained, which are then fractionated by hot extraction with solvents.

The acetone extract corresponds to 10.0% of the polymer obtained and consists of oily, low molecular weight products.

The ether extract corresponds to 45.2% of the polymer obtained and consists of a rubbery, amorphous solid having in Tetralin solutions at 135° C. an intrinsic viscosity equal to 0.82 (corresponding to a molecular weight of about 24,000).

The heptane extract corresponds to 16.4% of the polymer obtained and consists of a partially crystalline solid having an intrinsic viscosity of 1.31 (molecular weight about 48,000).

The residue which remains after said extractions corresponds to 28.2% of the polymer obtained and consists of a highly crystalline solid having an intrinsic viscosity equal to 1.88 (molecular weight about 85,000).

EXAMPLE XII 45 g. of pentene-1 and a solution of 5.7 g. of triethyl aluminum in 250 ml. of heptane are introduced under nitrogen into a 500 ml. flask fitted with a mechanical stirrer, a dropping funnel and a refluxing cooler. The whole is heated to 50° C. and at this temperature a solution of 3.8 g. of titanium tetrachloride in 20 ml. of n-heptane is dropped into the flask. A spontaneous increase of the temperature up to 70° C. is at once observed. The mass is kept in agitation for three hours at this temperature, then the organo-metallic compounds present are decomposed with methanol. The polymer obtained is purified as described in the preceding examples. 16.5 g. of polymer are thus obtained, which are extracted with solvents with heating.

The acetone extract corresponds to 47.8% of the polymer obtained and consists of oily products.

The extract obtained with ethyl acetate corresponds to 44.3% of the polymer obtained and consists of a rubbery, amorphous solid product.

The ether extract corresponds to 7.9% of the polymer obtained and consists of a solid polypentene which appears highly crystalline on X-ray examination.

EXAMPLE XIII

Two steel balls, a glass vial containing 13 g. of titanium tetrabromide and a solution of 11.4 g. of triethyl aluminum in 500 ml. of n-heptane are introduced under nitrogen into an autoclave of 1750 ml. capacity. The autoclave is heated, keeping it motionless, up to 63° C. and at this point 280 g. of propylene are introduced into the equipment. Soon afterwards the autoclave is put in motion, causing in this way the breaking of the vial. The temperature rises now spontaneously in a short lapse of time up to 97° C. and drops then again down to 85° C. The autoclave is kept in agitation at this temperature for about ten hours. The unreacted gases are vented and methanol is pumped into the autoclave.

The polypropylene is then purified in the usual manner; 249 g. of polymer are obtained, equal to a conversion of 89% of the monomer employed.

The acetone extract corresponds to 15.1% of the polymer obtained and consists of oily products.

The ether extract corresponds to 33% of the polymer obtained and consists of a rubbery, amorphous solid with intrinsic viscosity 0.53.

The heptane extract corresponds to 22.1% of the polymer obtained and consists of a partially crystalline solid having an intrinsic viscosity equal to 0.65. The residue which remains after said extractions corresponds to 30.8% of the polymer obtained and consists of a highly crystalline solid having, in Tetralin solutions at 135° C., an intrinsic viscosity equal to 1.78.

EXAMPLE XIV

Two steel balls, a glass vial containing 17 g. of titanium tetraiodide, and a solution of 11.4 g. of triethyl aluminum in 500 ml. of heptane are introduced into an autoclave of 2080 ml. capacity.

The autoclave is heated to 71° C. and at this temperature 268 g. of propylene are introduced and soon afterwards the autoclave is put in motion, causing in this way the breaking of the vial. The temperature rises spontaneously in a short lapse of time up to 100° C. and then drops again down to 90° C. The autoclave is kept in motion for about six hours and then the unreacted gases are vented, proceeding afterwards as described in the foregoing examples.

184 g. of propylene polymer are thus obtained, which are fractionated by extraction with hot solvents.

The acetone extract corresponds to 20.4 % of the polypropylene obtained and consists of oily, low molecular weight products.

The ether extract corresponds to 22.7% of the polymer obtained and consists of an amorphous solid having, in Tetralin solutions at 135° C., an intrinsic viscosity equal to 0.43.

The heptane extract corresponds to 22% of the polymer obtained and consists of partially crystalline solid with intrinsic viscosity 0.73.

The residue which remains after said extractions corresponds to 35% of the polymer obtained and consists of a powdery, highly crystalline solid having an intrinsic viscosity of 2.16.

EXAMPLE XV

Two steel balls, a glass vial containing 4.7 g. of zirconium tetrachloride, and a solution of 5.7 g. of triethyl aluminum in 100 ml. of n-heptane are introduced under nitrogen into a 435 ml. autoclave. The autoclave is heated, keeping it motionless, up to 97° C. and at this temperature 106 g. of propylene are injected into the autoclave which is soon afterwards put in motion. The autoclave is kept in agitation for fifteen hours at temperature of 80 to 85° C. and then methanol is pumped into it; the reaction product is discharged and purified, proceeding as described in the foregoing examples. 22 g. of polypropylene are thus isolated, which are then fractionated with solvents in the heat. The acetone extract corresponds to 60.4% of the polymer obtained and consists of semisolid, low molecular weight products.

The ether extract corresponds to 11.6% of the polymer obtained and consists of an amorphous solid with intrinsic viscosity 0.49.

The heptane extract corresponds to 13.85% of the polymer obtained and consists of a partially crystalline solid having an intrinsic viscosity of 0.94. The residue which remains after said extractions corresponds to 14.3% of the polymer obtained and consists of a highly crystalline solid with intrinsic viscosity 2.

EXAMPLE XVI 91 g. styrene and 11.4 g. triethyl aluminum dissolved in 500 cc. n-heptane are introduced into 2150 cc. autoclave. 282 g. propylene are then added and the autoclave is heated to 62° C. At this temperature 3.8 g. $TiCl_4$ dissolved in 40 cc. heptane are injected in the autoclave under nitrogen pressure. The temperature rises spontaneously to 100° C., and falls then slowly to 72° C.; at this point a second addition of 3.8 g. TiCl₄ in 40 cc. heptane is made. After about six hours from the beginning of the run the unreacted gases are vented and 24 normal liters are recovered.

Methanol is now pumped in the autoclave and the obtained polymer is purified in the usual way.

299 g. of a solid, white polymer are obtained, which is fractionally extracted with boiling acetone, ethyl ether and n-heptane, in succession. The acetone extract corresponds to 14.6% of the total obtained polymer and consists of oily products of low molecular wegiht. The ether extract is 32.8% of the total obtained polymer, and is a solid, amorphous product of rubber-like appearance. The n-heptane extract, 19.8% of the total, is a solid which becomes plastic at 90° C. The extraction residue, 32.8% of the total obtained polymer, is a powdery solid; the X-rays analysis reveals a content of crystalline polypropylene.

The U.V. spectra of n-heptane solutions of the fractions obtained by extraction with ether and n-heptane indicate the presence of aromatic rings. The ether and n-heptane extracts contain therefore a copolymer of propylene and styrene.

In the formula CH₂=CHR for the unsaturated hydrocarbon R may have a total of from 1 to 16 carbon atoms.

Since various changes and modifications in the specific details may be made in practicing the invention without departing from the spirit and scope thereof, it is to be understood that it is not intended to limit the invention except as defined in the appended claims.

What is claimed is:

1. A process for polymerizing monomeric materials selected from the group consisting of (a) unsaturated hydrocarbons of the formula CH₂=CHR in which R is selected from the group consisting of saturated aliphatic radicals containing 1 to 4 carbon atoms and the phenyl radical to solid linear polymerizates comprising a mixture of substantially linear, regular head-to-tail amorphous, atactic homopolymers, substantially linear, regular head-to-tail partially crystalline homopolymers, and homopolymers consisting of isotactic macromolecules as defined and which show a regular succession of —CH₂— and —CHR— groups in long linear chains which assume, at least for long macromolecule sections, a regular structure

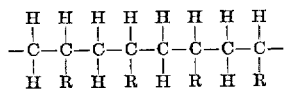

wherein R has the same significance as above and the asymmetric carbon atoms of the main chains have identical steric configurations on the same chain at least for long sections, and which macromolecules are crystallizable; (b) mixtures of said unsaturated hydrocarbons to solid linear copolymerizates; and (c) mixtures of said unsaturated hydrocarbons containing to to 10% of another olefinic monomer copolymerizable therewith to a solid linear copolymerizate, which process comprises contacting the monomeric material with a catalyst prepared by bringing a halide of a transition metal belonging to Groups IV to VI inclusive of the Mendeleeff Periodic Table in which the metal has a valency higher than 3 into intimate contact with an alkyl compound of an element belonging to Groups II to III inclusive of said table mixed with the monomeric material to be polymerized.

2. The process according to claim 1, characterized in that the monomeric material is propylene and the catalyst is formed by bringing titanium tetrachloride into intimate contact with triethyl aluminum mixed with propylene.

3. The process according to claim 1, characterized in that the monomeric material is propylene, and the catalyst is formed by bringing titanium tetrachloride into intimate contact with diethyl aluminum monochloride mixed with propylene.

4. The process according to claim 1, characterized in that the monomeric material is propylene and the catalyst is formed by bringing vanadium tetrachloride into intimate contact with triethyl aluminum mixed with propylene.

5. The process according to claim 1, characterized in that the monomeric material is propylene and the catalyst is formed by bringing zirconium tetrachloride into intimate contact with triethyl aluminum mixed with propylene.

6. The process according to claim 1, characterized in that the monomeric material is butene-1 and the catalyst is formed by bringing titanium tetrachloride into intimate contact with triethyl aluminum mixed with butene-1.

7. The process according to claim 1, characterized in that the monomeric material is pentene-1 and the catalyst is formed by bringing titanium tetrachloride into intimate contact with triethyl aluminum mixed with pentene-1.

8. The process according to claim 1, characterized in that the monomeric material is styrene and the catalyst is formed by bringing titanium tetrachloride into intimate contact wtih triethyl aluminum mixed with styrene.

9. The process according to claim 1, characterized in that the catalyst is formed by adding the transition metal halide to the alkyl compound of the element in a solution of the monomeric material to be polymerized in an inert hydrocarbon solvent.

10. The process according to claim 1, characterized in that the catalyst is formed by bringing the alkyl compound of the element, the monomeric material to be polymerized, and the transition metal halide together in that order.

11. The process according to claim 1, characterized in that the catalyst is formed by dissolving the alkyl compound of the element in the monomeric material to be polymerized while the latter is in liquid phase, and adding the transition metal halide to the solution.

12. A process for polymerizing propylene to a solid, linear polymerizate comprising a mixture of substantially linear, regular head-to-tail partially crystalline homopolymers, and homopolymers consisting of isotactic macromolecules as defined and which show a regular succession of —CH₂— and —CHCH₃— groups in long linear chains which assume, at least for long macromolecule sections, a regular structure

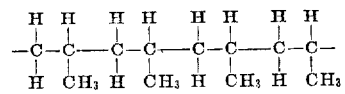

and the asymmetric carbon atoms of the main chains have identical steric configurations on the same chain at least for long sections, and which macromolecules are crystallizable, which process comprises contacting propylene with a catalyst prepared by bringing a halide of a transition metal belonging to Groups IV to VI inclusive of the Mendeleeff Periodic Table in which the metal has a valency higher than 3 into intimate contact with an alkyl compound of an element belonging to Groups II to III inclusive of said table mixed with propylene.

13. A process for polymerizing propylene to a solid linear polymer which process comprises contacting propylene with a catalyst prepared by bringing titanium tetrachloride into intimate contact with an alkyl compound of aluminum mixed with propylene.

14. A process for polymerizing monomeric materials selected from the group consisting of (a) unsaturated hydrocarbons of the formula CH₂=CHR in which R is selected from the group consisting of saturated aliphatic radicals containing from 1 to 4 carbon atoms and the phenyl radical; (b) mixtures of said unsaturated hydrocarbons; and (c) mixtures of said unsaturated hydrocarbons containing 1 to 10% of another, different olefinic monomer copolymerizable therewith, to solid linear poplymerizates, which comprises contacting the same with a catalyst prepared by bringing into intimate contact a halide of a transition metal belonging to Groups IV to VI inclusive of the Mendeleeff Periodic Table and an alkyl compound of an element belonging to Group II to III inclusive of said table in the monomeric material to be polymerized.

15. The process according to claim 14, characterized in that the monomeric material is propylene and the catalyst is prepared by bringing into intimate contact a halide of titanium and an alkyl aluminum compound in the propylene to be polymerized.

References Cited

UNITED STATES PATENTS

| 2,567,109 | 9/1951 | Howard | 260—80 |
| 2,721,189 | 10/1955 | Anderson et al. | 260—93.1 |

FOREIGN PATENTS

| 533,362 | 4/1955 | Belgium | 260—94.9 |

JOSEPH L. SCHOFER, Primary Examiner

E. J. SMITH, Assistant Examiner

U.S. Cl. X.R.

252—429; 260—88.2, 93.7, 85.3

UNITED STATES PATENT OFFICE
CERTIFICATE OF CORRECTION

Patent No. 3,582,987　　　　　　Dated　June 1, 1971

Inventor(s) Giulio Natta, et al

It is certified that error appears in the above-identified patent and that said Letters Patent are hereby corrected as shown below:

Col. 5, line 31, "Nataa" is corrected to read - - -Natta- - -.

Col. 14, line 49, "97°C " is corrected to read - - -79°C- - -.

Col. 15, line 60, "to" (1st occurrence) is corrected to read - - -1- - -;

line 61, "different" is inserted before "olefinic".

Signed and Sealed this

Twenty-fifth Day of January 1977

[SEAL]

Attest:

RUTH C. MASON  
*Attesting Officer*

C. MARSHALL DANN  
*Commissioner of Patents and Trademarks*